United States Patent
Kwon et al.

(10) Patent No.: US 9,356,287 B2
(45) Date of Patent: May 31, 2016

(54) NEGATIVE ACTIVE MATERIAL, NEGATIVE ELECTRODE AND LITHIUM BATTERY INCLUDING THE NEGATIVE ACTIVE MATERIAL, AND METHOD OF PREPARING THE NEGATIVE ACTIVE MATERIAL

(71) Applicant: SAMSUNG SDI CO., LTD., Yongin-si, Gyeonggi-do (KR)

(72) Inventors: Seung-Uk Kwon, Yongin-si (KR); Young-Ugk Kim, Yongin-si (KR); Jae-Hyuk Kim, Yongin-si (KR); Yury Matulevich, Yongin-si (KR); Yo-Han Park, Yongin-si (KR); Chang-Ui Jeong, Yongin-si (KR); Soon-Sung Suh, Yongin-si (KR); Hee-Young Chu, Yongin-si (KR); Duk-Hyoung Yoon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 6 days.

(21) Appl. No.: 14/331,214

(22) Filed: Jul. 14, 2014

(65) Prior Publication Data

US 2015/0021516 A1    Jan. 22, 2015

(30) Foreign Application Priority Data

Jul. 16, 2013 (KR) .......................... 10-2013-0083571

(51) Int. Cl.
    *G06F 7/04*      (2006.01)
    *H01M 4/38*      (2006.01)
    (Continued)

(52) U.S. Cl.
    CPC ............. *H01M 4/386* (2013.01); *B22D 11/001* (2013.01); *B22D 11/0631* (2013.01); *B22D 11/12* (2013.01); *C22C 1/02* (2013.01);
(Continued)

(58) Field of Classification Search
CPC ............... H01M 4/386; H01M 4/0488; B22D 11/0631; C22C 28/00
USPC ........................................................... 726/19
See application file for complete search history.

(56) References Cited

U.S. PATENT DOCUMENTS

| 6,265,111 B1 | 7/2001 | Bito et al. |
| 7,572,552 B2 | 8/2009 | Matsuno et al. |

(Continued)

FOREIGN PATENT DOCUMENTS

| JP | 06-325764 | 11/1994 |
| JP | 2002-203600 | 7/2002 |

(Continued)

OTHER PUBLICATIONS

English machine translation of Japanese Publication No. JP 06-325764, dated Nov. 25, 1994, 9 pages.

(Continued)

*Primary Examiner* — Mohammad W Reza
(74) *Attorney, Agent, or Firm* — Lewis Roca Rothgerber Christie LLP (57) ABSTRACT

A negative active material, a lithium battery including the negative active material, and a method of preparing the negative active material. The negative active material includes a silicon-based alloy including Si, Al, and Fe. The silicon-based alloy includes an active phase of silicon nanoparticles and an inactive phase of $Si_3Al_3Fe_2$ and $Si_2Fe$ in a ratios suitable to improve the lifespan of the lithium battery.

20 Claims, 5 Drawing Sheets

(51) Int. Cl.
  *H01M 10/0525* (2010.01)
  *H01M 4/36* (2006.01)
  *C22C 1/02* (2006.01)
  *B22D 11/00* (2006.01)
  *B22D 11/12* (2006.01)
  *H01M 4/04* (2006.01)
  *C22C 28/00* (2006.01)
  *B22D 11/06* (2006.01)

(52) U.S. Cl.
  CPC ............ *C22C 28/00* (2013.01); *H01M 4/0485* (2013.01); *H01M 4/0488* (2013.01); *H01M 4/364* (2013.01); *H01M 10/0525* (2013.01)

(56) References Cited

U.S. PATENT DOCUMENTS

| | | | |
|---|---|---|---|
| 7,736,806 B2 | 6/2010 | Shimamura et al. | |
| 7,858,232 B2 | 12/2010 | Bito et al. | |
| 2005/0095503 A1 | 5/2005 | Adachi et al. | |
| 2007/0037063 A1* | 2/2007 | Choi | H01M 4/134 429/330 |
| 2007/0079907 A1* | 4/2007 | Johnson | C22C 38/00 148/403 |
| 2007/0111100 A1 | 5/2007 | Bito et al. | |
| 2014/0023928 A1* | 1/2014 | Jeon | H01M 4/364 429/220 |

FOREIGN PATENT DOCUMENTS

| | | |
|---|---|---|
| JP | 2004-335439 | 11/2004 |
| JP | 2006-164960 | 6/2006 |
| JP | 2007-165300 | 6/2007 |
| JP | 2008-288214 | 11/2008 |
| JP | 2009-245773 | 10/2009 |
| JP | 2011-034836 | 2/2011 |
| KR | 10-2005-0020571 | 3/2005 |
| KR | 10-2005-0090220 | 9/2005 |
| KR | 2010-0078440 | 7/2010 |
| WO | WO 03/079469 A1 | 9/2003 |

OTHER PUBLICATIONS

English machine translation of Japanese Publication No. JP 2002-203600, dated Jul. 19, 2002, 32 pages.
U.S. Notice of Allowance dated Apr. 27, 2015, for cross reference U.S. Appl. No. 13/742,281 (now U.S. Pat. No. 9,123,955 B2), (8 pages).
Wang, X., et al., *A novel nanosized silicon-based composite as anode material for high performance lithium ion batteries*, Electrochemica Acta, vol. 56, (2011), pp. 1512-1517.
EPO Search Report dated Aug. 12, 2013 for European Patent application 13162609.5, (6 pages).
Patent Abstracts of Japan, and English machine translation of JP 2009-245773, dated Oct. 22, 2009, listed above, (37 pages).
Patent Abstracts of Japan, and English machine translation of JP 2011-034836, dated Feb. 17, 2011, listed above, (47 pages).

* cited by examiner

NEGATIVE ACTIVE MATERIAL, NEGATIVE ELECTRODE AND LITHIUM BATTERY INCLUDING THE NEGATIVE ACTIVE MATERIAL, AND METHOD OF PREPARING THE NEGATIVE ACTIVE MATERIAL

CROSS-REFERENCE TO RELATED APPLICATIONS

This application claims priority to and the benefit of Korean Patent Application No. 10-2013-0083571, filed on 16 Jul. 2013, in the Korean Intellectual Property Office, the disclosure of which is incorporated herein in its entirety by reference.

BACKGROUND

1. Field

One or more embodiments relate to a negative active material, a negative electrode and a lithium battery including the negative active material, and a method of preparing the negative active material.

2. Description of the Related Art

Lithium secondary batteries generate electric energy by oxidation and reduction reactions that occur when lithium ions are intercalated into, or deintercalated from, a positive electrode and a negative electrode, each including an active material enabling such intercalation and deintercalation of lithium ions, together with an organic electrolytic solution or a polymer electrolytic solution charged between the positive electrode and the negative electrode.

As negative active materials for the lithium secondary batteries, carbonaceous materials such as artificial graphite, natural graphite, and hard carbons; and non-carbonaceous materials such as Si and Sn, which enable intercalation or deintercalation of lithium ions, are commonly used.

Non-carbonaceous materials such as Si and Sn have a high capacity density (e.g., at least 10 times greater than that of graphite), however, due to volumetric expansion of the materials during a charge and discharge process, the capacity of the battery may deteriorate.

SUMMARY

One or more aspects of embodiments of the present invention include a negative active material including a silicon-based alloy that suitable to improve the lifespan of a lithium battery.

According to an embodiment of the present invention, a negative active material includes a silicon-based alloy including silicon nanoparticles dispersed in an alloy matrix. The alloy matrix includes $Si_3Al3Fe_2$ and $Si_2Fe$, in which the ratio of the sum of the atomic fractions of Si, Al, and Fe as $Si_3Al_3Fe_2$ to the sum of the atomic fractions of Si and Fe as $Si_2Fe$ is about 2 to about 12.

In one embodiment, the ratio of the sum of the atomic fractions of Si, Al, and Fe as $Si_3Al_3Fe_2$ to the sum of the atomic fractions of Si and Fe as $Si_2Fe$ is about 4 to about 10.

In one embodiment, the silicon-based alloy includes about 40 at % to about 80 at % of Si, about 10 at % to about 40 at % of Al, and about 5 at % to about 25 at % of Fe, and the total sum of atomic fractions of Si, Al, and Fe is 100 at %.

In one embodiment, in the silicon-based alloy, a ratio of the atomic fraction of Al to the atomic fraction of Fe is about 0.7 to about 1.1.

In one embodiment, the silicon-based alloy is a pulverized powder having a D50 of about 0.3 μm to about 10 μm.

In one embodiment, the silicon-based alloy includes inactive silicon and active silicon, the alloy matrix including the inactive silicon and the silicon nanoparticles including the active silicon.

In one embodiment, in the silicon-based alloy, an amount of the active silicon is about 40 at % to about 80 at % and an amount of the inactive silicon is about 20 at % to about 60 at %, based on 100 at % of the active silicon and the inactive silicon.

In one embodiment, an average diameter of the silicon nanoparticles is about 10 nm to about 500 nm.

In one embodiment, the negative active material further includes at least one selected from the group consisting of a carbonaceous lithium ion-intercalating and lithium ion-deintercalating material; a lithium metal; a lithium alloy; and a silicon-oxide-based material.

According to another embodiment of the present invention, a negative electrode includes the negative active material including the silicon-based alloy.

According to another embodiment of the present invention, a lithium battery includes the negative electrode.

According to a another embodiment of the present invention, a method of preparing a negative active material includes: preparing a mother alloy including about 40 at % to about 80 at % of Si, about 10 at % to about 40 at % of Al, and about 5 at % to about 25 at % of Fe, wherein the sum of atomic fractions of Si, Al, and Fe is 100 at %; melting the mother alloy to obtain a melt; rapidly solidifying the melt of the mother alloy to obtain a rapidly solidified alloy; and pulverizing the rapidly solidified alloy, to obtain a pulverized powder.

In one embodiment, the preparing of the mother alloy: vacuum induction melting a mixture of a metallic powder of Si, a metallic powder of Al, and a metallic powder of Fe; arc melting a mixture of a metallic powder of Si, a metallic powder of Al, and a metallic powder of Fe; or mechanically alloying a mixture of a metallic powder of Si, a metallic powder of Al, and a metallic powder of Fe.

In one embodiment, the mixture of the metallic powder of Si, the metallic powder of Al, and the metallic powder of Fe, includes about 40 at % to about 80 at % of Si, about 10 at % to about 40 at % of Al, and about 5 at % to about 25 at % of Fe, wherein the sum of atomic fractions of Si, Al, and Fe is 100 at %.

In one embodiment, rapidly solidifying the melt of the mother includes solidifying the melt by melt spinning, solidifying the melt by gas atomization, or solidifying the melt by strip casting.

In one embodiment, rapidly solidifying the melt of the mother includes solidifying the melt by melt spinning.

In one embodiment, the melt spinning includes rapidly cooling the melt at a speed of about $10^3$ K/sec to about $10^7$ K/sec.

In one embodiment, rapidly solidifying the melt of the mother alloy includes extruding the melt in a ribbon shape, to provide a ribbon-shaped solidified alloy.

In one embodiment, the ribbon-shaped solidified alloy has a thickness of about 5 μm to about 20 μm.

In one embodiment, the pulverized powder has a D50 of about 0.3 μm to about 10 μm.

BRIEF DESCRIPTION OF THE DRAWINGS

These and/or other aspects of the present invention will be more apparent from the following description of embodiments, taken in conjunction with the accompanying drawings, in which.

DETAILED DESCRIPTION

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Further, the use of "may" when describing embodiments of the present invention refers to "one or more embodiments of the present invention". Expressions such as "at least one of," when preceding a list of elements, modify the entire list of elements and do not modify the individual elements of the list. Like reference numerals designate like elements throughout the specification.

Hereinafter, some embodiments of the present invention are described in more detail.

According to an embodiment of the present invention, a negative active material includes a silicon-based alloy including silicon (Si), aluminum (Al), and iron (Fe). The silicon-based alloy includes an alloy matrix having silicon nanoparticles dispersed in therein. The alloy matrix includes $Si_3Al_3Fe_2$ and $Si_2Fe$, in which the ratio of the sum of the atomic fractions of Si, Al, and Fe as $Si_3Al_3Fe_2$ to the sum of the atomic fractions of Si and Fe as $Si_2Fe$ (herein also referred to as the "$Si_3Al_3Fe_2/Si_2Fe$ ratio," the "$Si_3Al_3Fe_2/Si_2Fe$ phase ratio," the "ratio of $Si_3Al_3Fe_2/Si_2Fe$," the "phase ratio of $Si_3Al_3Fe_2/Si_2Fe$," or the like) is about 2 to about 12. That is, in the alloy matrix, the ratio of $Si_3Al_3Fe_2/Si_2Fe$ is about 2 to about 12.

The silicon-based alloy may be ternary, for example, formed of Si, Al, and Fe. In some embodiments, the silicon-based alloy includes about 40 at % to about 80 at % of Si, about 10 at % to about 40 at % of Al, and about 5 at % to about 25 at % of Fe, with the sum of atomic fractions of Si, Al, and Fe being 100 at %. In these embodiments, $Si_3Al_3Fe_2$ may be formed along with $Si_2Fe$ as an inactive phase in the silicon-based alloy.

In one embodiment, silicon included in the silicon-based alloy includes a mixture of inactive silicon and active silicon. In one embodiment, active silicon may reversibly react with lithium ions, thus affecting capacity of a lithium battery. In one embodiment, the inactive silicon forms an inactive matrix structure, which does not react with (or substantially does not react with) lithium ions, and may thus inhibit volumetric expansion of the silicon-based alloy. The active silicon may be precipitated as nanoparticles in the inactive matrix and then dispersed therein. The silicon nanoparticles may be crystalloids or non-crystalloids.

In some embodiments, based on 100 at % of the total Si content in the Si-based alloy (including both the active silicon and the inactive silicon), the amount of the active silicon may be about 40 at % to about 80 at % and the amount of the inactive silicon may be about 20 at % to about 60 at %. In these embodiments, in a lithium battery including the silicon-based alloy as an active material on an electrode, volumetric expansion of the silicon-based alloy may be inhibited during a charge and discharge of the lithium battery, and capacity of the lithium battery may be improved.

In some embodiments, an average diameter of the silicon nanoparticles is about 10 nm to about 500 nm. For example, the average diameter of the silicon nanoparticles may be about 10 nm to about 200 nm, about 10 nm to about 150 nm, or about 10 nm to about 100 nm. In these embodiments, the silicon nanoparticles may be more easily and/or thoroughly distributed in the alloy matrix, and thus volumetric expansion of the silicon nanoparticles during a charge and discharge cycle may be prevented or reduced by the alloy matrix surrounding the silicon nanoparticles.

An average diameter of the silicon nanoparticles may be calculated using Scherrer's equation by using a half-width of a peak of a surface of Si 111 in an x-ray diffraction spectrum using a CuK-alpha characteristic x-ray having a wavelength of 1.541 Å.

In some embodiments, the inactive silicon together with other metal components such as Al and/or Fe, form the alloy matrix. The alloy matrix is an inactive phase and includes not only a ternary alloy phase of Si—Al—Fe, but also a binary alloy phase of Si—Fe. In one embodiment, the ternary inactive alloy phase is $Si_3Al_3Fe_2$, and the binary alloy phase is $Si_2Fe$.

When the alloy matrix is formed as a single phase of $Si_3Al_3Fe_2$, the amount of Si present in the inactive phase may be reduced to an amount suitable to provide a lithium battery with high capacity. However, the strength of such alloy matrix may be decreased based on the amount of Al present therein. An alloy matrix with decreased strength (e.g. an alloy matrix including only a single phase of $Si_3Al_3Fe_2$), may be damaged or destroyed with repeated expansions of the silicon nanoparticles during repeated charging and discharging of a lithium battery. If the alloy matrix is damaged or destroyed, the silicon nanoparticles, which are an active phase, may become further separated with each charge and discharge cycle, and the discharge capacity of the lithium battery may decrease.

According to embodiments of the present invention, in addition to the $Si_3Al_3Fe_2$, the negative active material further includes an $Si_2Fe$ as an inactive phase in the silicon-based alloy, which may increase the strength of the alloy matrix. The increase in the strength of the alloy matrix may prevent or reduce damage the by volumetric expansion of the silicon nanoparticles. Thus, a lithium battery including the negative active material according to embodiments of the present invention, may have improved capacity retention rate of the lithium battery during repeated charge and discharge processes.

In the silicon-based alloy, the ratio of the sum of the atomic fractions of Si, Al, and Fe as $Si_3Al_3Fe_2$ to the sum of the atomic fractions of Si and Fe as $Si_2Fe$, in the in the inactive phase, may about 2 to about 12. For example, the $Si_3Al_3Fe_2/Si_2Fe$ ratio may be about 4 to about 10. When a proportion of $Si_2Fe$ is too low, the strength of the alloy matrix may not be sufficiently increased. When the proportion of $Si_2Fe$ is too high, the overall amount of Si present in the inactive phase may be too high, and thus, the silicon-based alloy may not be suitable to increase capacity. According to some embodiments of the present invention, when the $Si_3Al_3Fe_2/Si_2Fe$ ratio is about 2 to about 12, a lithium battery including the silicon-based alloy may have a high capacity and increased strength of the inactive phase, the alloy matrix, thus improving the capacity retention rate of the lithium battery. The $Si_3Al_3Fe_2/Si_2Fe$ ratio may be, for example, about 4 to about 10.

In the silicon-based alloy, the ratio of the atomic fraction of Fe to the atomic fraction of Al, may about 0.7 to about 1.1. In the silicon-based alloy, the ratio of the atomic fraction of Fe to the atomic fraction of Al may be adjusted such that the $Si_3Al_3Fe_2/Si_2Fe$ ratio is about 2 to about 12. For example, a particular ratio of the atomic fraction of Fe to the atomic fraction of Al may be selected such that the $Si_3Al_3Fe_2/Si_2Fe$ ratio is about 2 to about 12. In the silicon based alloy, the ratio of the atomic fraction of Fe to the atomic fraction of Al may be, for example, about 0.7 to about 1 or to about 0.7 to about 0.9.

The silicon-based alloy may be pulverized to powder, and may be pulverized such that the D50 of resulting powder particles is about 0.3 µm to about 10 µm. The pulverized powder may be used to prepare the negative electrode. The term "D50" refers to a value of particle diameter at 50% in a cumulative distribution curve, in which the particles are cumulatively distributed from the smallest to the largest particles, based on 100% of the total number of particles. The D50 may be measured by any suitable or commonly used method. For example, the D50 may be measured by using a particle size analyzer, a transmission electron microscope (TEM), or a scanning electron microscope (SEM) image. As another example, the D50 may be measured by using a dynamic light-scattering device, and then performing data analysis to count the number of particles in each size range to calculate the D50.

According to an embodiment, the negative active material includes the silicon-based alloy and may further include any other suitable negative active material commonly used in a lithium battery. Non-limiting examples of such negative active materials include materials capable of intercalating and deintercalating of lithium, such as graphite, a carbonaceous material, a lithium metal or alloy thereof, a silicon-oxide-based material, or a mixture thereof may be used.

According to an embodiment, the negative active material includes the silicon-based alloy and a carbonaceous material. The carbonaceous material may be a crystalloid carbon such as natural graphite, artificial graphite, expandable graphite, graphene, carbon black, fullerene soot, carbon nanotubes, and/or carbon fiber; or a non-crystalloid carbon such as a soft carbon (low temperature calcined carbon), a hard carbon, a pitch carbide, a mesophase pitch carbide, and/or a calcined coke; or a mixture thereof. However, the carbonaceous material is not limited to these examples.

When the carbonaceous material is used together with the silicon-based alloy, an oxidation reaction of the silicon-based alloy may be inhibited (e.g., prevented or reduced) and a solid electrolyte interface (SEI) film may be suitably formed as form a stable thin film, which may improve electrical conductivity of the silicon-based alloy and thus may further improve charge and discharge characteristics of the lithium battery.

When the carbonaceous material is included in the negative active material, the carbonaceous material may be blended with with the silicon-based alloy by mixing, or may be coated on a surface of the silicon-based alloy.

The amount of the negative active material used together with the silicon-based alloy may be about 1 wt % to about 99 wt % based on the total amount of the material for the silicon-based alloy and any further material included in the negative active material (i.e., based on a total amount of the negative active material, including all components, e.g., the silicon-based alloy and a further negative active material).

In the negative active material, when the silicon-based alloy is a major component, the amount of the silicon-based alloy may be, for example, about 95 wt % to about 99 wt % based on the total amount of the negative active material (i.e., including the silicon-based alloy). When pitch, which is a non-crystalloid carbon, or graphite is included as a further negative active material, the pitch, which is a non-crystalloid carbon, or the graphite may be coated on a surface of the silicon-based alloy.

When the silicon-based alloy is a minor component in the negative active material, the amount of the silicon-based alloy may be about 1 wt % to about 5 wt % based on the total amount of the material for the negative active material (i.e., including the silicon-based alloy). When pitch, which is a non-crystalloid carbon, or graphite is used as the material for the negative active material, the pitch, which is a non-crystalloid carbon, or the graphite may serve as a buffer for the silicon-based alloy and may further improve the lifespan of the electrode.

Hereinafter, a method of preparing the negative active material including the silicon-based alloy is described in more detail.

According to an embodiment, a method of preparing the negative active material includes: preparing a mother alloy having a composition of about 40 at % to about 80 at % of Si, about 10 at % to about 40 at % of Al, and about 5 at % to about 25 at % of Fe, in which a the sum of atomic fractions of Si, Al, and Fe is 100 at %.

The method further includes melting the mother alloy to obtain a melt, rapidly solidifying the melt of the mother alloy to obtain a rapidly solidified alloy, and pulverizing the rapidly solidified alloy.

The method of preparing the mother alloy may be performed by vacuum induction melting (VIM), arc melting, or mechanical alloying, and may include, for example, a VIM in which the mother alloy is melted in a vacuum atmosphere to prevent or reduce oxidation by oxygen in the atmospheric (i.e., in air). However, the method of preparing the mother alloy is not limited thereto, and any suitable method commonly used to prepare the mother alloy may be used.

Any form of raw materials suitable to provide a desired composition ratio may be used for preparing the silicon-based alloy, and thus are not particularly limited. For example, elements, alloys, solid solutions, and/or intermetallic compounds may be used in forming a silicon-based alloy with a desired composition ratio.

By way of example, to prepare the mother alloy having a composition of about 40 at % to about 80 at % of Si, about 10 at % to about 40 at % of Al, and about 5 at % to about 25 at % of Fe, in which the sum of atomic fractions of Si, Al, and Fe is 100 at %, a metallic powder of each element may be weighed and mixed into a desired alloy composition ratio, and then the mother alloy of the silicon-based alloy may be prepared by using a vacuum induction melting furnace. The vacuum induction melting furnace is a device that is capable of melting a metal having a high melting temperature through a high frequency induction. During an initial melting process, an interior of the vacuum induction melting furnace may be evacuated and then backfilled with an inert or inactive gas, such as argon or any other suitable gas which does not react with the elements used to form the mother alloy or the mother alloy itself. For example, the evacuated melting furnace may be backfilled with any gas suitable to prevent or reduce oxidation of the prepared mother alloy. Then, the prepared mother alloy may be melted, and the resulting melt may be subjected to rapid solidification. The rapid solidification is not particularly limited. For example, rapid solidification may be performed by melt spinning, gas atomization, or strip casting. Through the rapid solidification process, inactive phases of $Si_3Al_3Fe_2$ and $Si_2Fe$ may form a matrix and an alloy in which silicon nanoparticles of an active phase are thoroughly distributed in the matrix.

According to an embodiment, the rapid solidification may be performed by melt spinning. For example, a melt of a mother alloy may be extruded onto a rapidly revolving wheel through a melt spinner device that uses a high frequency induction to rapidly solidify the melt. Here, the melt of the mother alloy may be rapidly cooled at a speed of about $10^3$ K/sec to about $10^7$ K/sec.

Because the melt of the mother alloy is cooled by the rapidly revolving wheel, as the melt of the mother alloy is extruded, the melt of the mother alloy may be in a ribbon shape, and the size of silicon nanoparticles distributed in the ribbon shape and the alloy may vary by a cooling rate. For example, to obtain suitably small silicon nanoparticles, the melt of the mother alloy may be cooled at a cooling rate of 1000° C./s or greater. Also, to obtain uniform silicon nanoparticles, a thickness of a ribbon-shaped product may be adjusted to be about 5 μm to about 20 μm or about 7 μm to about 16 μm.

The rapidly solidified ribbon-shaped alloy may be pulverized to a powder form to and used as a negative active material or a component thereof. Particles of the pulverized alloy powder may have a D50 of about 0.3 μm to about 10 μm. A pulverization method may include any method commonly used method. For example, a pulverizer may be an atomizer, a vacuum mill, a ball mill, a planetary ball, beads mill, or a jet mill, but the pulverizer is not limited thereto.

Pulverization methods may classified into dry pulverization methods and wet pulverization methods, and either of these two methods may be used.

A lithium battery according to another embodiment, includes a negative electrode including the above-described negative active material, including the silicon-based alloy; a positive electrode; and an electrolyte between the negative electrode and the positive electrode.

The negative electrode includes the above-described negative active material including the silicon-based alloy. The negative electrode may be prepared, for example, by mixing the negative active material, a binder, and optionally, a conductive material, in a solvent, to prepare a negative active material composition, which may then be molded any suitable shape or coated on a current collector such as a copper foil.

The binder used in the negative active material composition may facilitate bonding between the negative active material and the conductive material or the like. The binder may be included in an amount of about 1 part by weight to about 50 parts by weight based on 100 parts by weight of the negative active material. For example, the binder may be included in an amount of about 1 part by weight to about 30 parts by weight, about 1 part by weight to about 20 parts by weight, or about 1 part by weight to about 15 parts by weight based on 100 parts by weight of the negative active material. Non-limiting examples of the binder include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenolic resin, epoxy resin, polyethylene terephthalate, polytetrafluoroethylene, polyphenyl sulfide, polyamide imide, polyetherimide, polyethylene sulfone, polyamide, polyacetal, polyphenylene oxide, polybutylene terephthalate, ethylene-propylene-diene terpolymer (EPDM), sulfonated EPDM, styrene-butadiene rubber, fluoro rubber, and/or other suitable copolymer.

The negative electrode may provide a conductive pathway to the above-described negative active material and may optionally further include a conductive material to improve electrical conductivity. The conductive material may be any suitable conductive material commonly used in a lithium battery, for example, a carbonaceous material such as carbon black, acetylene black, ketjen black, and/or carbon fiber (for example, vapor grown carbon fiber); a metallic material such as a metal powder or a metal fiber of copper, nickel, aluminum, and/or silver; a conductive polymer such as a polyphenylene derivative; or a mixture thereof. Any suitable amount of the conductive material may be used. For example, the conductive material may be included in an amount such that a weight ratio of the negative active material to the conductive material is about 99:1 to about 90:10.

N-methylpyrrolidone, acetone, water, and/or the like may be used as the solvent, but the solvent is not limited thereto. The amount of the solvent may be about 1 part by weight to about 10 parts by weight based on 100 parts by weight of the negative active material. When the amount of the solvent is about 1 part by weight to about 10 parts by weight based on 100 parts by weight of the negative active material, forming an active material layer may be easier.

The current collector may have a thickness of about 3 μm to about 500 μm. The current collector may include any material which as conductivity and does not (or substantially does not) induce chemical changes in the battery. Non-limiting examples of the current collector include copper, stainless steel, aluminum, nickel, titanium, calcined carbon; surface treated copper or stainless steel with carbon, nickel, titanium, silver, or the like, aluminum-cadmium alloy, and a combination thereof. Small irregularities may be formed on a surface of the current collector to increase bonding strength of the negative active material, and the current collector may be used in various forms such as a film, a sheet, a foil, a net, a porous body, a foam, and/or a non-woven fabric.

The prepared negative active material composition may be directly coated on the current collector to prepare a negative electrode plate, or may be cast on a separate support, such that a negative active material film separated from the support may be laminated on a copper current collector to obtain a negative electrode plate.

The form of the negative electrode is not limited to the above described examples.

In a further embodiment, the negative active material composition described herein may also be printed on a flexible electrode substrate and used for manufacturing a printable battery.

A positive active material composition including a positive active material, a conductive material, a binder, and a solvent may be mixed to prepare a positive electrode. The positive active material may include any suitable lithium-containing metal oxide that is commonly used in lithium batteries. Non-limiting examples of the positive active material include:

$LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($0\leq y<1$), $LiCo_{1-y}Mn_yO_2$ ($0\leq y<1$), $LiNi_{1-y}Mn_yO_2$ ($0\leq y<1$), $LiMn_{2-z}Ni_zO_4$ ($0<z<2$), $LiMn_{2-z}Co_zO_4$ ($0<z<2$), $LiCoPO_4$, and/or $LiFePO_4$.

In the positive active material composition, the conductive material, the binder, and the solvent may be the same as those used in the negative active material composition. In some embodiments, a plasticizer may be added to the positive active material composition and/or the negative active material composition, for example, to form holes in the interior of the electrode plate. The amounts of the positive active material, the conductive material, the binder, and the solvent include, but are not limited to, the same as those commonly used in a lithium battery.

The positive current collector may have a thickness of about 3 μm to about 500 μm, and may include any material which as a suitable conductivity and does not (or substantially does not) induce a chemical change in the battery. Non-limiting examples of the positive current collector include stainless steel, aluminum, nickel, titanium, and/or calcined carbon; surface treated aluminum and/or stainless steel with carbon, nickel, titanium, silver, and/or the like. A small irregularity may be formed on a surface of the current collector to increase bonding strength of the positive active material, and the current collector may be used in various forms such as a film, a sheet, a foil, a net, a porous body, a foam, and/or a pelt.

The prepared positive active material composition may be directly coated and dried on the positive current collector to prepare a positive electrode plate. Alternatively, the positive active material composition may be cast on a separate support, so that a film peeled off of the support may be laminated on the positive current collector to prepare the positive electrode plate.

The positive electrode and the negative electrode may be separated by a separator, and the separator includes any suitable separator commonly used in a lithium battery, for example, a separator having low resistance with respect to the mobility of ions of an electrolyte while having good electrolyte solution absorption ability. Non-limiting examples of a material for the separator include a glass fiber, polyester, Teflon, polyethylene, polypropylene, polytetrafluoroethylene (PTFE), and a combination thereof. The separator material may have a non-woven fabric or a woven fabric form. By way of example, a separator may have a thickness of about 5 μm to about 300 μm and may have pores with a diameter of about 0.01 μm to about 10 μm.

A lithium-salt-containing non-aqueous electrolyte solution may include a non-aqueous electrolyte and a lithium salt. The non-aqueous electrolyte solution may be a solid electrolyte or an inorganic solid electrolyte.

Non-limiting examples of the non-aqueous electrolyte solution include an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethyl sulfoxide, 1,3-dioxolane, formamide, dimethyl formamide, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and/or ethyl propionate.

Non-limiting examples of the organic solid electrolyte include polyethylene derivatives, polyethylene oxide derivatives, polypropylene oxide derivatives, a phosphoric acid ester polymer, a poly agitation lysine, a polyester sulfide, a polyvinyl alcohol, a polyvinylidene fluoride, and/or a polymer containing an ionic dissociation group (e.g., a group capable of ionizing in a solution).

Non-limiting examples of the inorganic solid electrolyte include a nitride, a halide, and/or a sulfate of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

Any suitable lithium salt commonly used in a lithium battery may be used and/or any lithium salt which is soluble in the non-aqueous electrolyte. Non-limiting examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium-chloro-borate, lithium lower aliphatic carboxylic acid, tetraphenyl borate lithium, and/or lithium imide.

A lithium battery may be classified into a lithium ion battery, a lithium ion polymer battery, and a lithium polymer battery depending on the type of the separator and the electrolyte used; a cylindrical shape, a rectangular shape, a coin shape, and a pouch shape depending on the shape of the lithium battery; and a bulk type and a thin film type depending on the size of the lithium battery. Also, the lithium battery may be a lithium primary battery or a lithium secondary battery.

Any commonly used method of manufacturing a lithium battery may be used.

Figure 1:
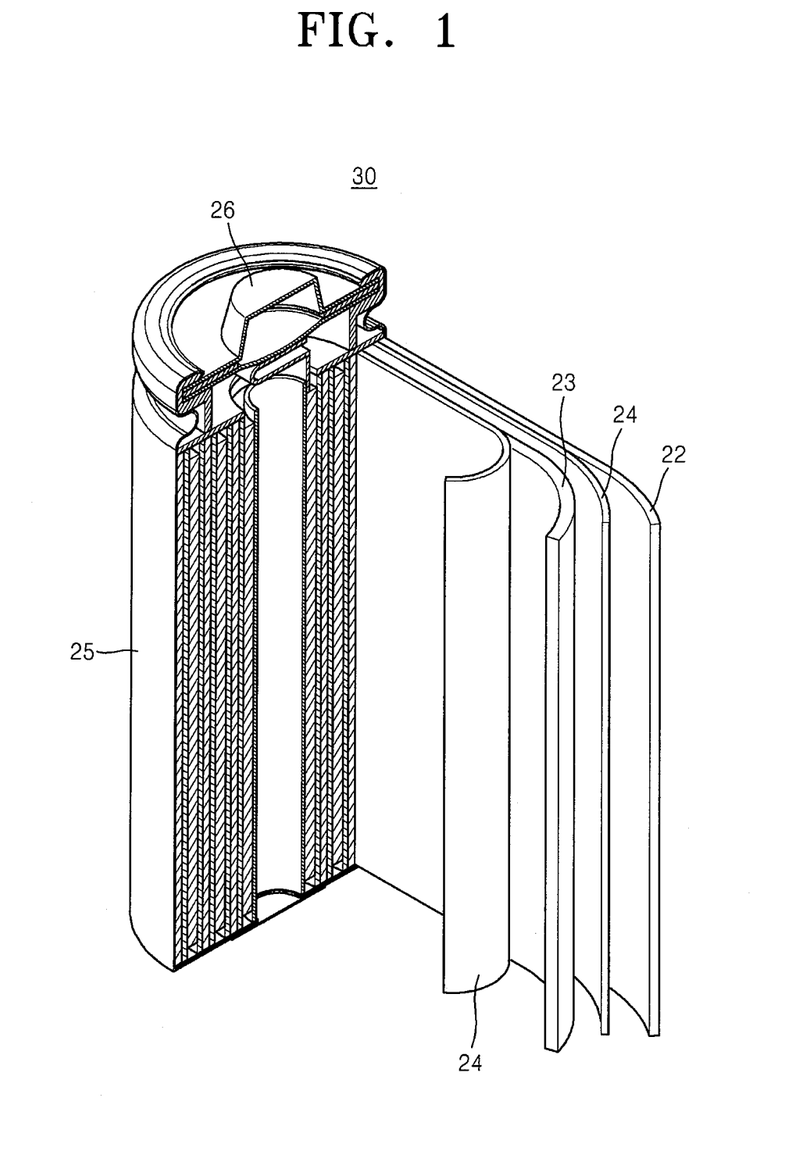
FIG. 1 is a schematic view illustrating a cross-sectional structure of a lithium battery according to an embodiment.

FIG. 1 is a schematic view illustrating a representative structure of a lithium battery according to an embodiment.

Referring to FIG. 1, the lithium battery 30 includes a positive electrode 23, a negative electrode 22, and a separator 24 between the positive electrode 23 and the negative electrode 22. The positive electrode 23, the negative electrode 22, and the separator 24 described above may be wound or folded to be enclosed in a battery case 25. An electrolyte may be injected into the battery case 25, which may then be sealed by using a sealing member 26 to complete the manufacturing lithium battery 30. The battery case 25 may have a cylindrical shape, a rectangular shape, a thin film shape, or the like. The lithium battery may be a lithium ion battery. Embodiments of the present invention are not limited to any particular type of lithium battery and/or methods of manufacturing the lithium battery.

In addition to mobile phones, portable computers, and the like, lithium batteries are also suitable for devices or applications that require high capacity, high output, and/or high temperature drive, such as in electric vehicles. For example, the lithium battery described herein, may be coupled to an internal combustion engine, a fuel cell, or a supercapacitor, to be used in a hybrid vehicle. Also, the lithium battery may be used for any other devices or applications that require high output, high voltage, and high temperature drive.

Hereinafter, exemplary embodiments will be described in greater detail through the following Examples and Comparative Examples. However, these Examples and Comparative Examples are for illustrative purposes only and do not limit the scope of the present invention.

(Preparation of a Negative Active Material and a Lithium Battery)

A Si alloy negative active material including only $Si_3Al_3Fe_2$ as the inactive phase in a Si—Al—Fe ternary alloy was prepared. The prepared alloy was then used as a Comparative Example. A Si alloy negative active material including $Si_2Fe$ and $Si_3Al_3Fe_2$ phases as inactive phases, prepared according to an embodiment of the present invention, was used as Examples 1 to 5. The Examples were classified into 1, 2, 3, 4, and 5, depending on a ratio between the $Si_2Fe$ phase and the $Si_3Al_3Fe_2$ phase. The Examples were prepared such that the amount of Si active phase was maintained at a similar level to achieve similar levels of discharge capacities, so as to more clearly show improvement in lifespan characteristics base on the ratio of the $Si_2Fe$ phase and the $Si_3Al_3Fe_2$ phase.

Comparative Example

First, Si, Al and Fe were mixed in a ratio of 58 at %, 25.2 at % and 16.8 at %, respectively to provide a mixture and the mixture was then inserted into a vacuum induction melting furnace (available from Yein Tech., Korea), in which the mixture was melted under vacuum atmosphere to inhibit oxidation caused by atmospheric air, to prepare a mother alloy.

The prepared mother alloy was pulverized into large lumps, which were inserted into a melt spinner (available from Yein Tech., Korea). The large lumps were then subjected to a high-frequency induction heating under argon gas atmosphere to melt-mix the mother alloy, and the melt-mixed mother alloy was sprayed onto a revolving Cu wheel through a nozzle to inject the alloy in a ribbon shape, which was then rapidly solidified as a ribbon.

The prepared alloy ribbon was pulverized using a ball mill to obtain an Si alloy powder having particles with an average diameter (D50) of about 3 μm to about 5 μm.

The prepared Si alloy powder was used as a negative active material to prepare a coin cell battery as follows.

To prepare a negative active material slurry, the Si alloy powder as the negative active material, polyamide-imide as a binder, and ketjen black and graphite as a conductive material, were mixed in a weight ratio of 80:8:2:10, respectively, and then N-methylpyrrolidone was added to the mixture to adjust the viscosity such that a solid content in the negative active material slurry reached 60 wt %. The prepared slurry was coated on a copper foil current collector having a thickness of 10 μm, to prepare a negative electrode plate. The coated electrode plate was dried at a temperature of 110° C. for 15 minutes and then roll-pressed such that a density of the negative electrode plate was 1.5 g/cc. The dried negative electrode plate was heat-treated under a vacuum atmosphere at a temperature of 350° C. for 1 hour, and then the electrode plate was cut into a size of 16 mm to prepare a negative electrode for a coin cell battery. As the counter electrode, Li metal was used, a polypropylene separator (Celgard 3501) having a thickness of 20 μm was used, and an electrolyte solution was injected, to prepare a compressed coin cell battery having a 2016 standard. Here, the electrolyte used included $LiPF_6$ dissolved in a solvent mixture of ethylene carbonate (EC), diethyl carbonate (DEC), and fluoroethylene carbonate (FEC) in a volume ratio of 3:3:4, respectively, to provide a $LiPF_6$ concentration of 1.10 M.

Example 1

A compressed coin cell battery was prepared in the same way as the Comparative Example, except for the following. As an inactive phase in the Si alloy powder, a mother alloy composition was modified to include an $Si_2Fe$ phase in addition to an $Si_3Al_3Fe_2$ phase Additionally, a mixture ratio of Si, Al, and Fe for preparing the mother alloy was changed to 59.6 at %, 23.2 at %, and 17.2 at %, respectively.

Example 2

A compressed coin cell battery was prepared in the same way as Example 1, except that a mixture ratio of Si, Al, and Fe for preparing the mother alloy was changed to 59.8 at %, 22.8 at %, and 17.4 at %, respectively.

Example 3

A compressed coin cell battery was prepared in the same way as Example 1, except that a mixture ratio of Si, Al, and Fe for preparing the mother alloy was changed to 60.8 at %, 21.6 at %, and 17.6 at %, respectively.

Example 4

A compressed coin cell battery was prepared in the same way as Example 1, except that a mixture ratio of Si, Al, and Fe for preparing the mother alloy was changed to 61.5 at %, 20.7 at %, and 17.8 at %, respectively.

Example 5

A compressed coin cell battery was prepared in the same way as Example 1, except that a mixture ratio of Si, Al, and Fe for preparing the mother alloy was changed to 63.8 at %, 17.7 at %, and 18.5 at %, respectively.

Evaluation Example 1

Phase Analysis of Si Alloy Powder

Phase analyses of the Si alloy powders prepared in the Comparative Example and Examples 1 to 5 were performed by using X'pert PRO MPD (XRD, available from PANalytical), and the results are shown in FIGS. 2 to 7. The experiment was performed with a CuK-alpha characteristic x-ray having a wavelength of 1.541 Å.

The composition ratios of the Si alloy powders prepared in the Comparative Example and Examples 1-5 are summarized in Table 1 below.

TABLE 1

| | Composition ratio (at %) | | | Active Si | $Si_3Al_3Fe_2$ | $Si_2Fe$ | $Si_3Al_3Fe_2/$ | |
| --- | --- | --- | --- | --- | --- | --- | --- | --- |
| | Si | Al | Fe | (at %) | (at %) | (at %) | $Si_2Fe$ | Fe/Al |
| Comparative Example | 58.0 | 25.2 | 16.8 | 32.8 | 67.2 | 0 | — | 0.67 |
| Example 1 | 59.6 | 23.2 | 17.2 | 32.9 | 61.9 | 5.2 | 11.9 | 0.74 |
| Example 2 | 59.8 | 22.8 | 17.4 | 32.6 | 60.8 | 6.6 | 9.2 | 0.76 |
| Example 3 | 60.8 | 21.6 | 17.6 | 32.8 | 57.6 | 9.6 | 6.0 | 0.81 |
| Example 4 | 61.5 | 20.7 | 17.8 | 32.8 | 55.2 | 12.0 | 4.6 | 0.86 |
| Example 5 | 63.8 | 17.7 | 18.5 | 32.7 | 47.2 | 20.1 | 2.3 | 1.05 |

Figure 2:
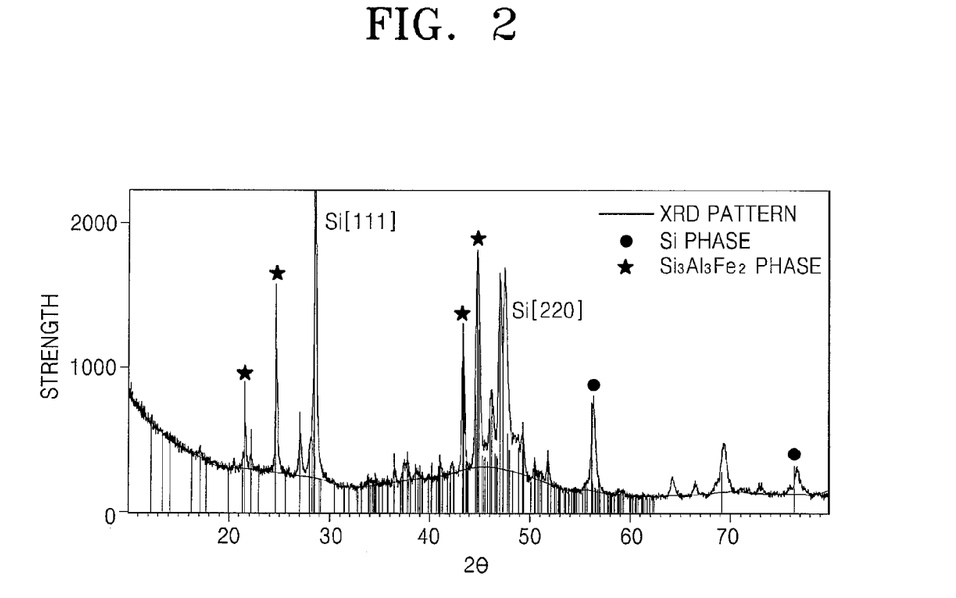
FIG. 2 shows x-ray diffraction (XRD) patterns and phase analysis of the silicon-based alloy powder prepared in a Comparative Example.

As shown in FIG. 2, the Si alloy powder of the Comparative Example only showed the $Si_3Al_3Fe_2$ phase as the inactive phase. 32.8 at % of Si that was unable to form a ternary alloy appeared as an active phase, which became Si capable of bonding with Li ions.

Figure 3:
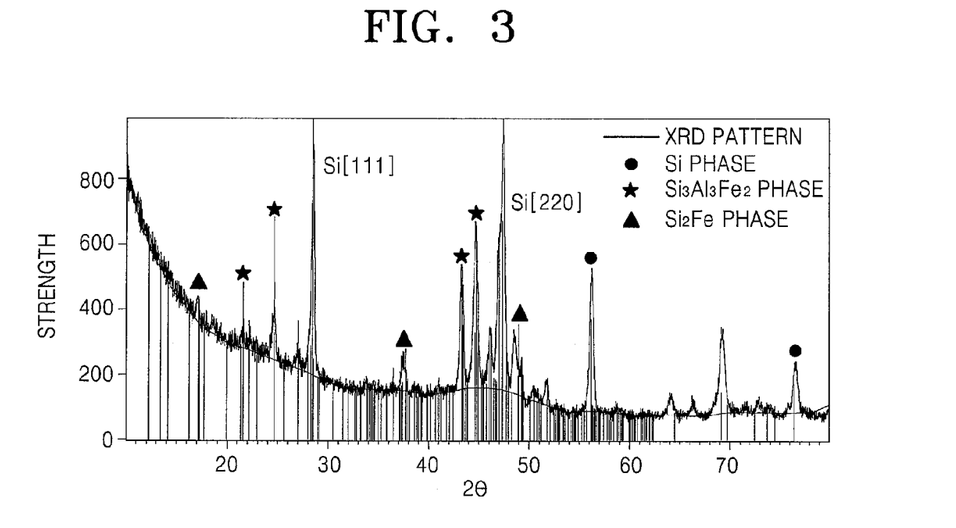
FIG. 3 shows XRD patterns and phase analysis of the silicon-based alloy powder prepared in Example 1.
Figure 4:
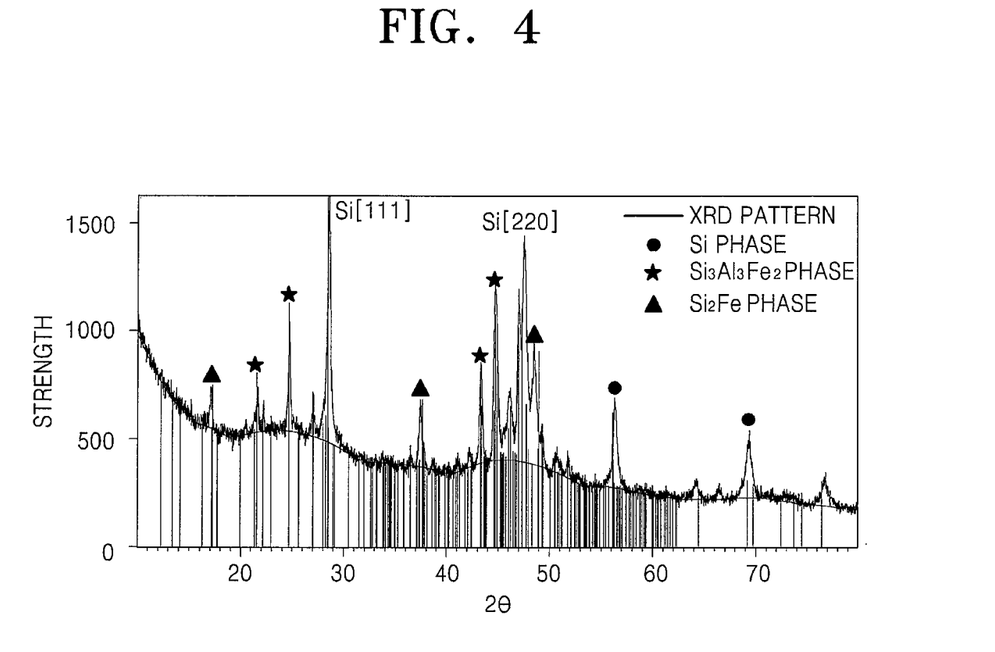
FIG. 4 shows XRD patterns and phase analysis of the silicon-based alloy powder prepared in Example 2.
Figure 5:
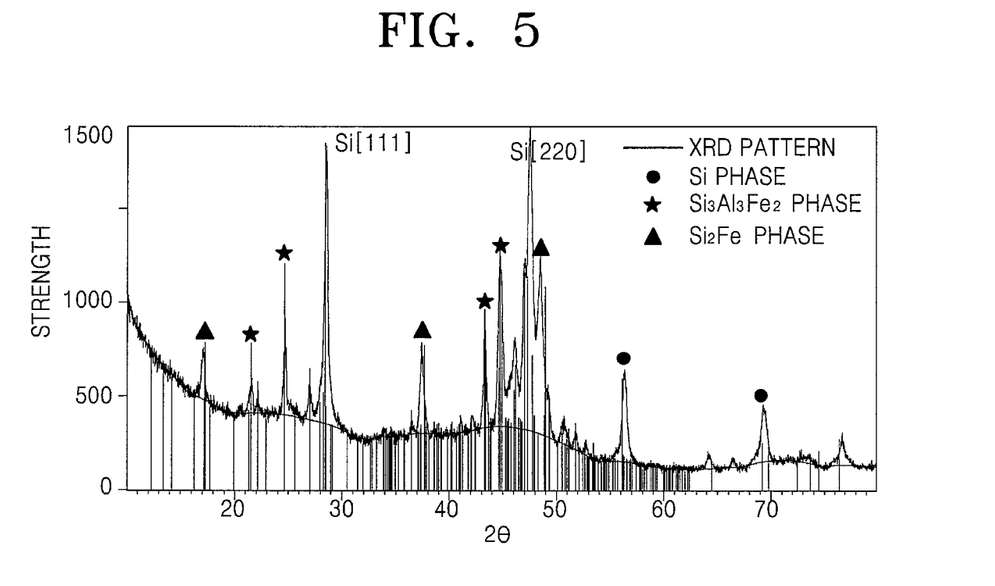
FIG. 5 shows XRD patterns and phase analysis of the silicon-based alloy powder prepared in Example 3.
Figure 6:
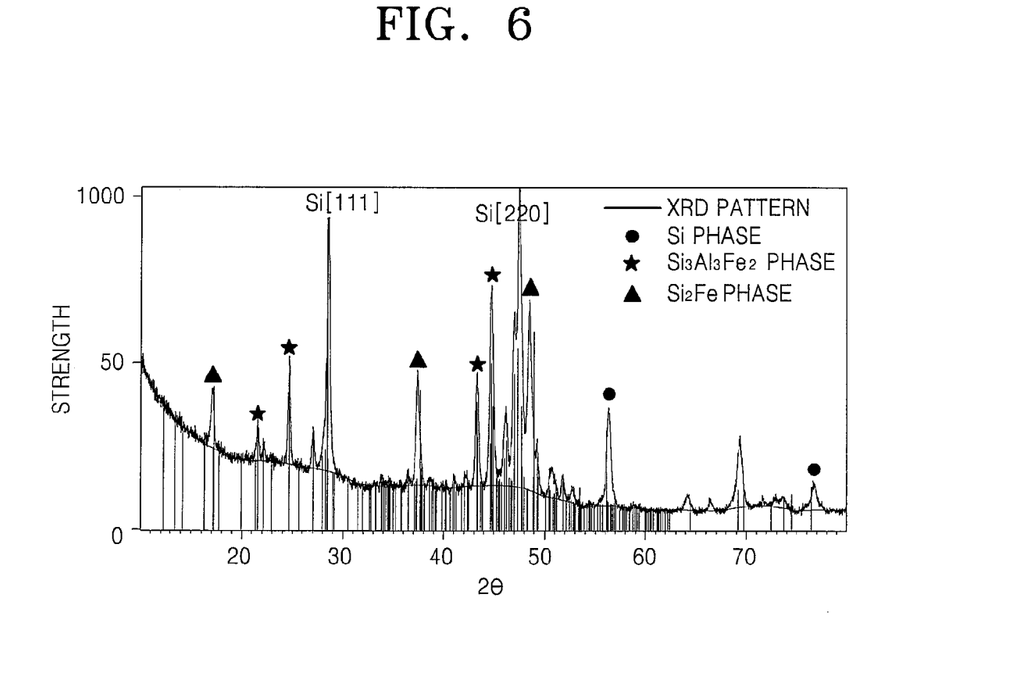
FIG. 6 shows XRD patterns and phase analysis of the silicon-based alloy powder prepared in Example 4.
Figure 7:
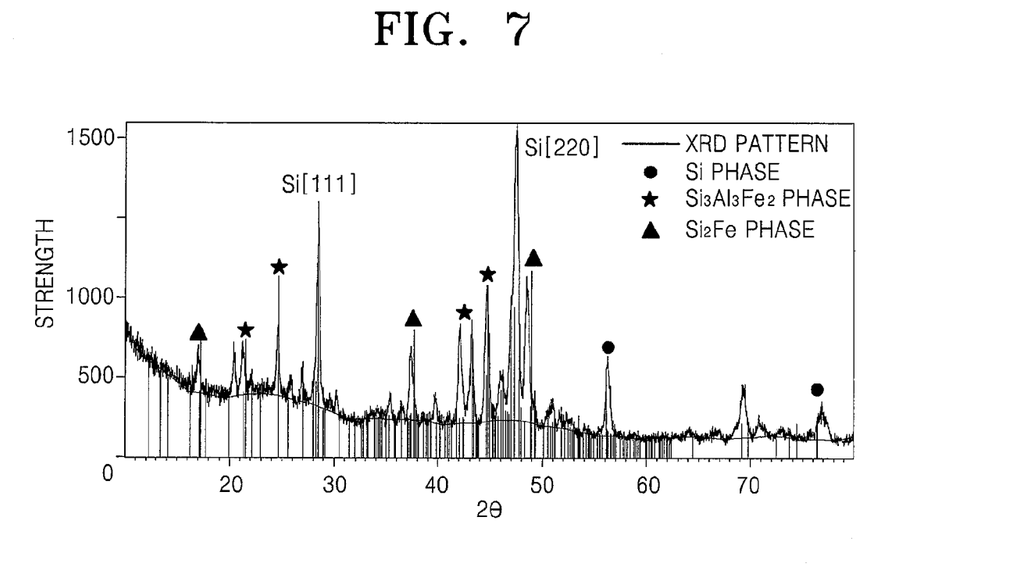
FIG. 7 shows XRD patterns and phase analysis of the silicon-based alloy powder prepared in Example 5.

On the contrary, as the inactive phases of Examples 1 to 5, the $Si_2Fe$ phase in addition to the $Si_3Al_3Fe_2$ phase was formed together. In Example 1, the at % of the $Si_2Fe$ phase was small and thus, the phase ratio of $Si_3Al_3Fe_2/Si_2Fe$ was the highest, and as shown in FIG. 3, the peak of the $Si_2Fe$ phase was the weakest. In Example 5, the at % of $Si_2Fe$ phase was the greatest and the phase ratio of $Si_3Al_3Fe_2/Si_2Fe$ was the smallest, and as shown in FIG. 7, the peak of the $Si_2Fe$ phase was very strong.

Accordingly, Example 1 formed the smallest amount of $Si_2Fe$ phase, and the amount of the $Si_2Fe$ phase progressively increased from Examples 2 to 5. As described above, the amount of the Si active phase, which has great effect on the discharge capacity, was maintained at the same level.

Evaluation Example 2

Evaluation of Cell Lifespan

Figure 8:
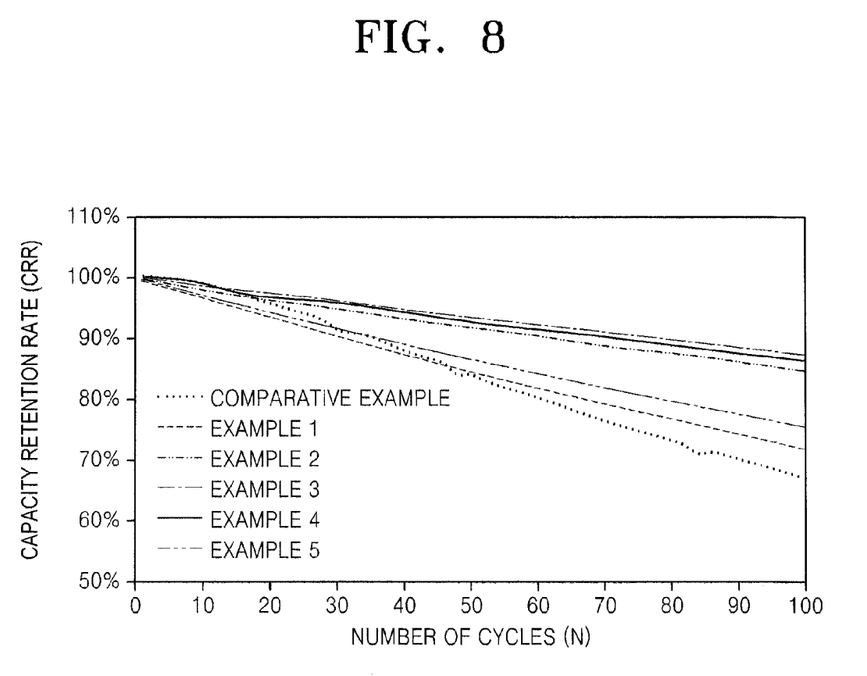
FIG. 8 shows capacity retention rates as a function of cycle for the coin cells manufactured in the Comparative Example and Examples 1 to 5.

A capacity retention ratio (CRR) was measured by charging at 1.0 C and discharging at 1.0 C the coin cell batteries prepared in the Comparative Example and Examples 1 to 5. The resulting capacity retention rate as a function of cycle, are shown in FIG. 8. The capacity retention rate is defined by Equation 1.

$$\text{Capacity retention rate [\%]} = [\text{discharge capacity in each cycle/discharge capacity in the } 1^{st} \text{ cycle}] \times 100 \quad \text{Equation 1}$$

As shown in FIG. 8, the Comparative Example appeared to show a good capacity retention rate initially, but the capacity retention rate began to decrease due to an additional decrease in the discharge capacity. This phenomenon is commonly observed in an Si alloy, and the phenomenon may occur because when Li ions undergo a repetitious intercalation and deintercalation, the Si nanoparticles of the active phase expand, thus causing the inactive phase ($Si_3Al_3Fe_2$) to expand and deteriorate, resulting in separation of the Si nanoparticles of the active phase, and reducing the discharge capacity.

On the contrary, as shown in FIG. 8, Examples 1 to 5 showed greater capacity retention rates compared to the Comparative Example. This indicates that when the iron silicide ($Si_2Fe$) phase is included in the Si alloy as the inactive phase, strength of the inactive phase increases, which reduces deterioration of the inactive phase caused by expansion, compared to the Comparative Example. Particularly in Examples 2 to 4, when the phase ratio of $Si_3Al_3Fe_2/Si_2Fe$ was about 4 to about 10, the inclusion of a suitable amount of the $Si_2Fe$ phase provided good improvement in the capacity retention rate of the coin cell battery.

As described above, according to the one or more embodiments, the negative active material includes $Si_3Al_3Fe_2$ and $Si_2Fe$ in the silicon-based alloy formed of Si, Al, and Fe in a ratio suitable to improve lifespan characteristics of a lithium battery.

It should be understood that the exemplary embodiments described therein should be considered in a descriptive sense only and not for purposes of limitation. Descriptions of features or aspects within each embodiment may be considered as available for other similar features or aspects in other embodiments.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative active material comprising a silicon-based alloy comprising silicon nanoparticles dispersed in an alloy matrix, the alloy matrix comprising $Si_3Al_3Fe_2$ and $Si_2Fe$, wherein the ratio of the sum of the atomic fractions of Si, Al, and Fe as $Si_3Al_3Fe_2$ to the sum of the atomic fractions of Si and Fe as $Si_2Fe$ is about 2 to about 12.

2. The negative active material of claim 1, wherein the ratio of the sum of the atomic fractions of Si, Al, and Fe as $Si_3Al_3Fe_2$ to the sum of the atomic fractions of Si and Fe as $Si_2Fe$ is about 4 to about 10.

3. The negative active material of claim 1, wherein the silicon-based alloy comprises about 40 at % to about 80 at % of Si, about 10 at % to about 40 at % of Al, and about 5 at % to about 25 at % of Fe, and the total sum of atomic fractions of Si, Al, and Fe is 100 at %.

4. The negative active material of claim 1, wherein in the silicon-based alloy, a ratio of the atomic fraction of Al to the atomic fraction of Fe is about 0.7 to about 1.1.

5. The negative active material of claim 1, wherein the silicon-based alloy is a pulverized powder having a D50 of about 0.3 μm to about 10 μm.

6. The negative active material of claim 1, wherein the silicon-based alloy comprises inactive silicon and active silicon, the alloy matrix comprising the inactive silicon and the silicon nanoparticles comprising the active silicon.

7. The negative active material of claim 6, wherein in the silicon-based alloy, an amount of the active silicon is about 40 at % to about 80 at % and an amount of the inactive silicon is about 20 at % to about 60 at %, based on 100 at % of the active silicon and the inactive silicon.

8. The negative active material of claim 1, wherein an average diameter of the silicon nanoparticles is about 10 nm to about 500 nm.

9. The negative active material of claim 1, further comprising at least one selected from the group consisting of a carbonaceous lithium ion-intercalating and lithium ion-deintercalating material; a lithium metal; a lithium alloy; and a silicon-oxide-based material.

10. A negative electrode, comprising the negative active material of claim 1.

11. A lithium battery, comprising the negative electrode of claim 10.

12. A method of preparing a negative active material, the method comprising:
preparing a mother alloy comprising about 40 at % to about 80 at % of Si, about 10 at % to about 40 at % of Al, and about 5 at % to about 25 at % of Fe, wherein the sum of atomic fractions of Si, Al, and Fe is 100 at %;
melting the mother alloy to obtain a melt;
rapidly solidifying the melt of the mother alloy to obtain a rapidly solidified alloy; and
pulverizing the rapidly solidified alloy, to obtain a pulverized powder.

13. The method of claim 12, wherein the preparing of the mother alloy comprises one selected from the group consisting of:
vacuum induction melting a mixture of a metallic powder of Si, a metallic powder of Al, and a metallic powder of Fe;

arc melting a mixture of a metallic powder of Si, a metallic powder of Al, and a metallic powder of Fe; and mechanically alloying a mixture of a metallic powder of Si, a metallic powder of Al, and a metallic powder of Fe.

14. The method of claim 13, wherein the mixture of the metallic powder of Si, the metallic powder of Al, and the metallic powder of Fe, comprises about 40 at % to about 80 at % of Si, about 10 at % to about 40 at % of Al, and about 5 at % to about 25 at % of Fe, wherein the sum of atomic fractions of Si, Al, and Fe is 100 at %.

15. The method of claim 12, wherein rapidly solidifying the melt of the mother alloy comprises solidifying the melt by melt spinning, solidifying the melt by gas atomization, or solidifying the melt by strip casting.

16. The method of claim 12, wherein rapidly solidifying the melt of the mother alloy comprises solidifying the melt by melt spinning.

17. The method of claim 16, wherein the melt spinning comprises rapidly cooling the melt at a speed of about $10^3$ M/sec to about $10^7$ K/sec.

18. The method of claim 12, wherein rapidly solidifying the melt of the mother alloy comprises extruding the melt in a ribbon shape, to provide a ribbon-shaped solidified alloy.

19. The method of claim 18, wherein the ribbon-shaped solidified alloy has a thickness of about 5 μm to about 20 μm.

20. The method of claim 12, wherein pulverized powder has a D50 of about 0.3 μm to about 10 μm.

\* \* \* \* \*